UNITED STATES PATENT OFFICE.

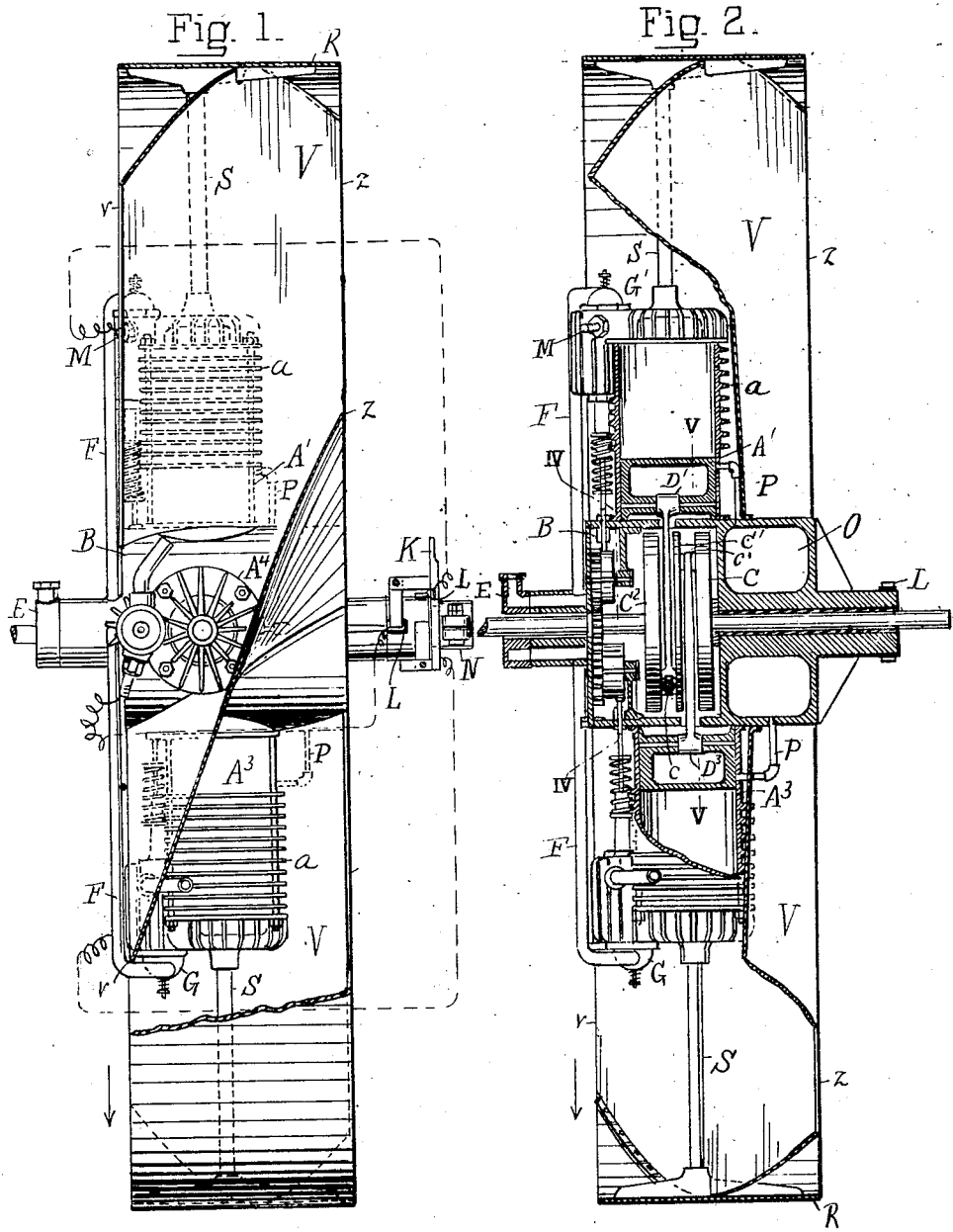

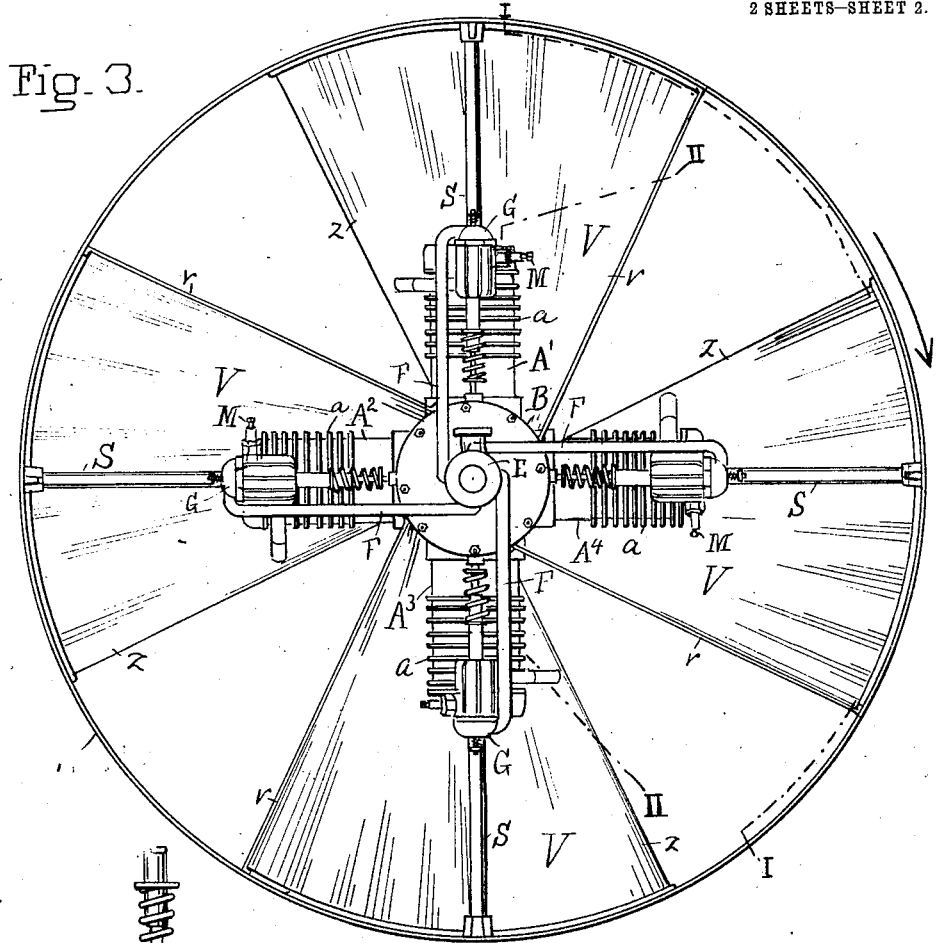
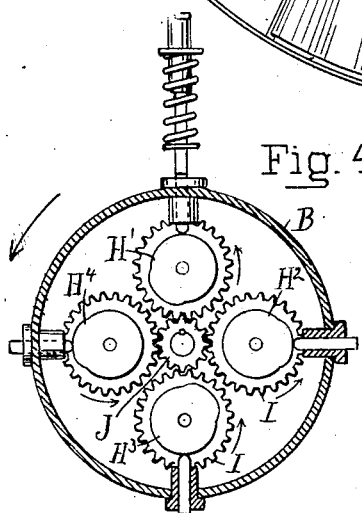
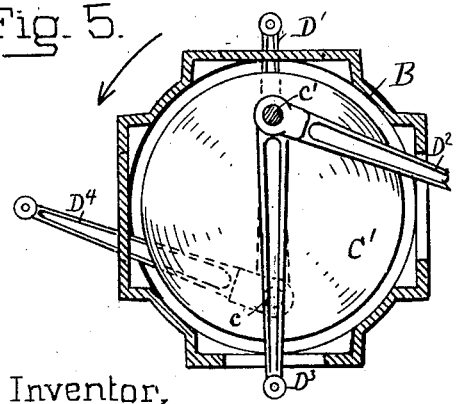

WILLIAM HARPER, JR., OF NEW BLOOMFIELD, PENNSYLVANIA.

COMBINED EXPLOSIVE-ENGINE AND AIR-PROPELLER

1,012,201.  Specification of Letters Patent.  Patented Dec. 19, 1911.

Application filed May 19, 1905. Serial No. 261,135.

*To all whom it may concern:*

Be it known that I, WILLIAM HARPER, Jr., a citizen of the United States of America, and a resident of New Bloomfield, Perry county, and State of Pennsylvania, have invented certain new and useful Improvements in Combined Explosive-Engines and Air-Propellers, of which the following is a specification.

My invention relates particularly to the direct combination of an explosive engine with the blades of an air propeller, whereby the propeller blades and engine cylinders have common support and revolve about stationary cranks of the explosive engine.

The apparatus is intended for aerial propulsion wherein extreme lightness and maximum power is the chief object. These are principally attained by arranging for the direct transmission of energy from the engine to the propeller without intervening couplings, bearings and shafts or other transmission mechanism, and a further elimination of weight arises from the opportunity thereby arising for the common support of the propeller and engine and the utilization of the entire mass of the engine, excepting only the cranks, for a fly-wheel, thereby dispensing with weight for this special purpose.

A further object of the invention is a provision for the storage of oil for lubrication in a chamber adjacent to and forming a part of the crank-case, and effecting feed of oil under pressure by centrifugal force.

A further object of the invention is to secure perfect balancing of the power impulses together with as evenly spaced a succession of impulses as practicable, whereby additional lightness of construction will be admissible.

In the accompanying two sheets of drawings, which form a part of this specification, Figure 1 is a side elevation broken away on the line I—I of Fig. 3, showing a combined gas engine and propeller embodying my invention. Fig. 2 is a section on the line II—II of Fig. 3. Fig. 3 is a front view of the propeller and engine. Fig. 4 is a section through the crank-case on the line IV—IV of Fig. 2, showing the valve operating cams. Fig. 5 is a section through the crank-case on the line V—V of Fig. 2, showing the relative positions of the cranks and pitmen.

The engine comprises four cylinders $A'$ $A^2$ $A^3$ $A^4$, equally spaced around a crank-case B. The cylinders are provided with ribs $a$ for air cooling. The cylinders $A'$ and $A^4$ are spaced at right angles and with their axes in the same plane, but in advance of the plane of the other two cylinders, $A^2$ and $A^3$, so that they can be connected with a double crank formed with three disks C C' $C^2$ and cranks $c$ $c'$ set oppositely, the cylinders $A'$ and $A^4$ being connected by the pitmen $D'$ $D^4$ with the crank $c$ and the cylinders $A^2$ and $A^3$ being connected with the crank $c'$ by the pitmen $D^2$ $D^3$ respectively. By reason of this construction the pistons of the cylinders $A'$ and $A^3$, which are opposite, throw oppositely, as is also the case with the pistons of the cylinders $A^2$ $A^4$, so that the engine as a whole will be free from transverse vibration. Gas is brought to the engine through a swivel joint coupling E and conveyed through pipes F F to the valve-chambers G G, through which it is admitted to the cylinders. Each cylinder, as illustrated, is of the usual four-cycle type, four consecutive strokes being used to draw in, compress, explode and expel the charge. The valves for opening the exhausts from the cylinders are operated by cams $H'$ $H^2$ $H^3$ $H^4$ attached to gears I I which mesh with a stationary gear J of half the size, whereby the four-cycle operation is controlled. A brush rigging K, which is held stationary, makes contact with contact-blocks L L carried by the hub of the crank-case, and current is conveyed from these blocks to the spark-plugs M M, for the explosion of the charges in the cylinder at the proper time. The brush rigging is revolubly mounted on a clamp N by which the crank-shaft is held, and may be set to adjust the moments of explosion in each of the cylinders with reference to the commencements of the explosion or power strokes. The cams for operating the valves are preferably so set and the contact blocks are preferably so placed, as shown, so that the power strokes of opposite cylinders will be concurrent, thereby balancing forces and permitting lighter construction. The power strokes of one pair of cylinders are alternated with the power strokes of the other pair of cylinders at intervals alternating three quarters of a revolution and a revolution and a quarter.

The engine is lubricated by oil contained in a chamber O which is formed at one end of the crank-case surrounding the crank-shaft, and the oil is fed to the cylinders through pipes P, centrifugal force effecting the oil feed. A steel rim R encircles the engine, and spokes S connect the tops of the engine cylinders with the rims. Four propeller blades V V are set against each cylinder and lie between the rim and crank-case to each of which they are secured. The ribs of the cylinders are cut away on the side adjoining the blades sufficiently to permit the blades to set close to the cylinder bodies. The elements of the propeller blades are lines radial to the crank-shaft. The blades may therefore be set snugly against the sides of the cylinders and the cylinders utilized throughout their lengths as supports for the blades. The cylinders lie on the advancing or rarefying sides of the blades. The blades are preferably slightly concave toward the compression sides. The advancing edges $v$ of the blades being each at a slightly lesser angle than the leaving edges $z\ z$.

What I claim as new and desire to secure by Letters Patent of the United States is:

1. In an explosive engine, the combination of a stationary crank-shaft, a crank-case rotative on the crank shaft, cylinders attached to the case, an oil-containing chamber surrounding the crank-shaft and oil feed connections from the oil chamber to the cylinders, substantially as described.

2. In a combined explosive engine and air propeller, the combination of a stationary crank-shaft, a crank-case, rotative on the crank shaft, cylinders attached to the crank-case, and propeller blades rigidly attached to the crank-case along diagonal lines lying between the cylinders and extending from one side of the crank-case to the other, substantially as described.

3. In a combined explosive engine and air propeller, the combination of a stationary crank-shaft, a crank-case, rotative on the crank shaft, cylinders attached to the crank-case, a rim, spokes between the cylinder ends and the rim, and propeller blades rigidly supported between the rim and crank-case along diagonal lines lying between the cylinders, substantially as described.

4. In a combined explosive engine and air propeller, the combination of a stationary crank-shaft, cylinders, a crank-case supporting the cylinders, the crank-case being rotative on the crank-shaft, and propeller blades the elements of which are radial to the crank-shaft supported by the crank-case and intermediate of their edges by the cylinders, substantially as described.

5. In a combined explosive engine and air propeller, the combination of a stationary crank-shaft, a crank-case rotative on a crank-shaft, cylinders attached to the crank-case, and propeller blades extending beyond the outer end of the cylinders and rigidly connected to the crank-case, substantially as described.

Signed by me at New Bloomfield, Pennsylvania, this 17th day of May, 1905.

WILLIAM HARPER, Jr.

Witnesses:
JOHN C. MOTTER,
DAVID N. HARPER.